United States Patent [19]

Hesse et al.

[11] Patent Number: 5,326,822
[45] Date of Patent: Jul. 5, 1994

[54] HEAT-CURABLE MOLDING MATERIAL

[75] Inventors: Anton Hesse; Walter Heckmann, both of Weinheim; Harald Kroeger, Schifferstadt; Bernd L. Marczinke, Speyer; Volker Warzelhan, Weisenheim, all of Fed. Rep. of Germany

[73] Assignee: BASF Aktiengesellschaft, Ludwigshafen, Fed. Rep. of Germany

[21] Appl. No.: 904,669

[22] Filed: Jun. 26, 1992

[30] Foreign Application Priority Data

Jul. 27, 1991 [DE] Fed. Rep. of Germany ....... 4124952

[51] Int. Cl.$^5$ .............................................. C08F 8/00
[52] U.S. Cl. .................................... 525/168; 525/55; 525/165; 525/240; 525/243; 525/437; 525/448; 525/921; 524/500; 524/502; 524/515; 524/539; 522/104; 522/107; 522/110
[58] Field of Search ............... 525/437, 445, 448, 921, 525/240, 243, 55, 165, 168; 524/500, 502, 515, 539; 522/104, 107, 110

[56] References Cited

U.S. PATENT DOCUMENTS 3,642,683  2/1972  Fry ....................................... 524/314
3,852,376 12/1974  Bando et al. ........................... 525/49
4,161,471  7/1979  Kassal .
5,098,950  3/1992  Kagaya et al. ......................... 525/28

FOREIGN PATENT DOCUMENTS 1153905  9/1963  Fed. Rep. of Germany .
 927830  6/1963  United Kingdom .

Primary Examiner—Samuel A. Acquah
Attorney, Agent, or Firm—Oblon, Spivak, McClelland, Maier & Neustadt

[57] ABSTRACT

A heat-curable molding material consists of an unsaturated polyester, monomers, a propylene polymer, free radical initiators and conventional additives and assistants, the propylene polymer being dispersed in the form of solid, round particles having a smooth surface and a mean diameter of from 1 to 200 μm in the polyester resin.

8 Claims, 1 Drawing Sheet

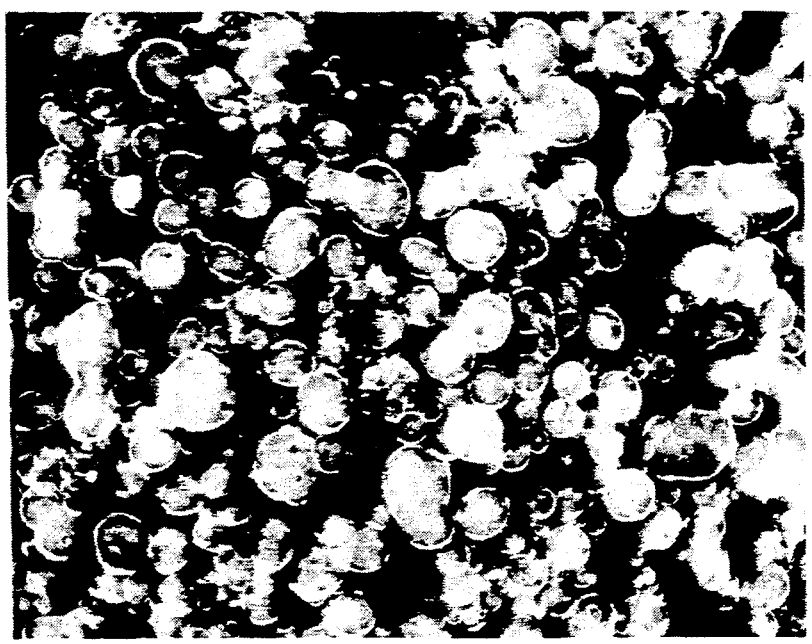

HEAT-CURABLE MOLDING MATERIAL

The present invention relates to a heat-curable molding material based on an unsaturated polyester resin which contains a dispersed propylene polymer.

Molding materials based on fiber-reinforced unsaturated polyester resins are increasingly being used for the production of moldings, in particular in automotive construction. They are processed predominantly in the form of thickened, sheet-like semifinished products, i.e. sheet molding compounds (SMC) or as dough-like molding material, i.e. bulk molding compounds (BMC). In both cases, an unsaturated polyester resin which is mixed with reinforcing fibers, fillers, free radical initiators and other additives is used as a starting material. Processing is carried out by pressing or extrusion at a relatively low temperature of about 130-160° C. and even complicated molds can easily be filled. The moldings produced therewith, in particular when shrinkage-reducing thermoplastics have been added to the molding materials, have an excellent surface. A decisive disadvantage of such moldings is, however, their brittleness, which prevents wide use in applications where greater toughness is required in the case of shock and impact.

In comparison, thermoplastic molding materials reinforced with long fibers have excellent toughness. They are also simple to process but their preparation by impregnating the fibers with solutions or melts of the thermoplastic is very expensive.

It is an object of the present invention to combine the advantages of the molding materials based on unsaturated polyester resins with the advantages of those based on thermoplastics, i.e. to provide molding materials which are simple to prepare and to process but, when cured, furthermore give moldings having great toughness.

We have found that this object is achieved by a heat-curable molding material containing A) 100 parts by weight of an unsaturated polyester,
B) from 0 to 400 parts by weight of a vinyl or allyl monomer copolymerizable with A),
C) from 5 to 200 parts by weight of a semicrystalline propylene homo- or copolymer containing predominantly propylene and having a random distribution of the monomers,
D) from 0.01 to 5 parts by weight of a free radical initiator and
E) conventional additives and assistants, component C) being dispersed in the form of solid, round particles having a smooth surface and a mean diameter of from 1 to 200 μm in a coherent phase of the components A)+B).

In production on an industrial scale, polypropylene is obtained as granules or grit having a diameter of more than 1 mm. It cannot be milled at room temperature. In the very expensive low-temperature milling, which is not without danger owing to the risk of dust explosions, particles which have a diameter of from 150 to 300 μm and an irregular shape and rough, porous surface are obtained. If such milled polypropylene particles are added to unsaturated polyester resins and the latter are cured, the resulting moldings have an irregular surface. The novel dispersion of solid, round polypropylene particles having a smooth surface and a diameter of from 1 to 200 μm in the polyester resin is obtained if a melt of the propylene polymer and a melt of the unsaturated polyester are subjected together to a strong shear field.

DE-B 1 153 905 describes a process for the preparation of molding materials, in which a mixture of more than 50% by weight of polyolefin and less than 50% by weight of unsaturated polyester resin is thoroughly kneaded in the presence of free radical initiators at from 60° to 350° C. The components may first be premixed in a conventional mixing apparatus, for example in a vortex mixer or paddle mixer. However, this does not give a dispersion of round, finely divided polyolefin particles in the polyester resin. When the mixture is kneaded in the presence of a free radical initiator, the polyester resin undergoes crosslinking and is then dispersed in the polyolefin as a coherent phase. The molding material obtained no longer has the good flow of an unsaturated polyester resin.

DE-A 1 817 575 describes a heat-curable molding material of an unsaturated polyester, a saturated liquid polyester and a thermoplastic polymer. The polymer, preferably an olefin, is intended to prevent exudation of the saturated, liquid polyester during heat-curing of the molding material. In the Example, finely divided polyethylene having a particle size of from 8 to 30 μm is mixed with a polyester resin. This cannot be extrapolated to polypropylene, since such a fine polypropylene powder also cannot be prepared by low-temperature milling. Mixing of polyolefin and unsaturated polyester in a strong shear field is neither described nor indicated in the publication, so that the latter does not give any instructions on the preparation of a dispersion of finely divided, round polypropylene particles in an unsaturated polyester resin.

DE-A 23 05 246 relates to an unsaturated polyester resin material which contains dispersed olefin graft polymer powder. The added graft polymer is intended to reduce shrinkage during curing and to avoid adhesion of the resin to the mold wall. In the Examples, only graft polymers based on polyethylene or polybutene powder are used; once again, direct extrapolation to polypropylene is not possible.

Finally, U.S. Pat. No. 4,161,471 describes SMC and BMC materials which are elastified by adding a chloroprene or ethylene/propylene rubber. In an expensive process, the ethylene/propylene copolymers are first subjected to thermal degradation, then converted into a paste with styrene and mixed with a polyester resin paste. An oil-in-oil emulsion is formed, i.e. the propylene polymer is not present in the form of solid particles in the polyester resin.

Regarding the individual components, the following may be stated:

A) Unsaturated polyesters contain

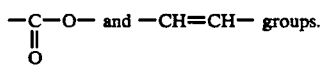

1. The unsaturated polyesters (UP) in the stricter sense are preferred. These are condensates of polybasic, in particular dibasic, carboxylic acids and esterifiable derivatives thereof, in particular anhydrides thereof, which are linked to polyhydric, in particular dihydric, alcohols by an ester-like bond and may contain additional radicals of monobasic carboxylic acids or monohydric alcohols, and some or all of the starting materials must have ethylenically unsaturated copolymerizable groups.

The acid number of the unsaturated polyester resin should be less than 100, in particular from 0 to 50. Polyester resins of maleic acid, if necessary together with o-phthalic acid on the one hand and diols, such as dipropylene glycol, diethylene glycol and/or propane-1,2-diol, on the other hand, dissolved in styrene, are particularly preferred.

Particularly good binding of the polypropylene phase to the polyester phase in the molding is obtained when the unsaturated polyester resins contain cycloaliphatic building blocks, preferably those based on dicyclopentadiene, tetrahydrophthalic acid or endomethylenetetrahydrophthalic acid. The amount of the cycloaliphatic building blocks in the unsaturated polyester is preferably from 0.1 to 2 mol per (maleic acid+fumaric acid) building block.

2. Vinyl ester resins (VE resins) are also suitable.

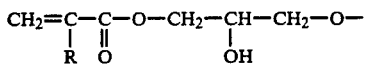

where R is H or $CH_3$, is typical of this class of resins.

VE resins, which are also referred to as epoxy acrylates, are understood generally as meaning reaction products of polyepoxides with unsaturated monocarboxylic acids, preferably with methacrylic acid. These resins are described, for example, in GB-A 1 006 587 and in U.S. Pat. Nos. 3,066,112 and 3,179,623, VE resins based on bisphenol A being preferably used. They possess great toughness and good chemical resistance in conjunction with limited heat distortion resistance. On the other hand, vinyl ester resins of epoxy/novolak resins and (meth)acrylic acid, as described in, for example, U.S. Pat. No. 3,256,226, have higher heat distortion resistances but lower toughnesses.

3. Vinyl ester urethane resins (VU resins) are known, for example from U.S. Pat. Nos. 3,297,845, 3,772,404, 4,618,658, GB-A 2 217 722 and DE-A 37 44 390. They generally contain the following groups:

a) 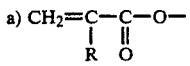

(where R is H or $CH_3$)

b) 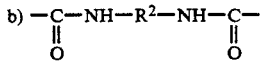

(where $R^2$ is a divalent aliphatic, aromatic or cycloaliphatic radical of 4 to 40 carbon atoms, preferably an aromatic radical of 6 to 20 carbon atoms), if necessary

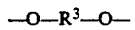 c)

(where R3 is a divalent aliphatic, cycloaliphatic or aromatic radical of 2 to 500 carbon atoms, preferably an aliphatic radical of 4 to 100 carbon atoms) and, if required,

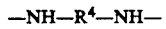 d)

(where $R^4$ is an aliphatic, cycloaliphatic or aromatic radical of 2 to 100 carbon atoms).

The VU resin is preferably a reaction product of a polyfunctional isocyanate, if necessary a polyhydric alcohol, if necessary a polyfunctional amine and a hydroxyalkyl (meth)acrylate, in the reaction the weight ratio of isocyanate to (alcohol+amine) being from 100:0 to 100:300 and the ratio of the number of equivalents of hydroxyalkyl (meth)acrylate to the number of equivalents of free isocyanate groups in the reaction product being from 3:1to1:2.

B) Suitable comonomers are the conventional vinyl and allyl compounds, preferably styrene, α-methylstyrene, vinyltoluene, methyl methacrylate, diallyl phthalate and diallyl isophthalate. They are present in the molding materials in amounts of not more than 400, preferably from 20 to 400, in particular from 20 to 150, parts by weight, based on 100 parts by weight of the unsaturated polyester depending on the field of use.

C) The propylene polymers are semicrystalline and their crystallite melting point should be higher than 125° C., preferably higher than 155° C. Low molecular weight polymers having a melt flow index MFI greater than 10, preferably from 20 to 150, g/10 min (at 230° C. and 2.16 kg) are particularly suitable.

Polypropylene which is prepared by polymerization of propylene in the presence of a Ziegler-Natta catalyst system is preferred.

Also preferred are graft polymers, prepared by polymerization of unsaturated carboxylic acids or derivatives thereof, especially of acrylic acid or maleic acid anhydride, in the presence of polypropylene. This chemical modification improves the adherence of glass fibres and matrix. In many cases it is sufficient to add up to about 30% by weight of the graft polymer to unmodified polypropylene.

Copolymers prepared by random copolymerization of propylene with ethylene, but-1-ene, pent-1-ene, 3-methylpent-1-ene, hex-1-ene, hept-1-ene or oct-1-ene or dienes, such as norbornadiene or dicyclopentadiene, having a propylene content greater than 50%, are also suitable.

Polymer blends in which not more than 50% by weight of other thermoplastics, for example polyamides, saturated polyesters, styrene polymers, polyethylene or polycarbonate, have been mixed with the olefin polymer may also be used.

The propylene polymer is present in the molding material in amounts of from 5 to 200, preferably from 10 to 150, parts by weight, based on 100 parts by weight of unsaturated polyester.

D) The molding material contains from 0.01 to 5, preferably from 0.2 to 2, parts by weight, based on 100 parts by weight of polyester, of a polymerization initiator. Conventional peroxides decomposing into free radicals at above 50° C. are used as polymerization initiators. Their half life at 50° C. should preferably be greater than 100 hours. Diacyl peroxides, peroxydicarbonates, peroxyesters, perketals, ketone peroxides, hydroperoxides and dialkyl peroxides are suitable. Azo and C-C labile compounds may also be used as free radical initiators.

E) Suitable further conventional additives and assistants are: Reinforcing fibers in amounts of from 10 to 400 parts by weight, based on 100 parts by weight of unsaturated polyester. The known inorganic and organic fibers, for example of glass, carbon, cellulose, polyethylene, polycarboxylates or polyamide, may be used as reinforcing fibers. They may be in the form of short fibers or milled fibers, as long fibers in the form of individual rovings, webs of parallel rovings, laid webs of oriented fibers, fiber mats, fleeces, woven fibers or knitted fibers, but preferably as cut rovings having a length of not more than 5 cm.

Fillers in amounts of from 0 to 300 parts by weight, such as chalk, kaolin, quartz powder, talc, hydrated alumina, dolomite, mica and wollastonite.

Thermoplastic polymers in amounts of not more than 100, preferably from 5 to 50, parts by weight based on 100 parts by weight of unsaturated polyester, as shrinkage-reducing or elastifying additives. Examples of suitable thermoplastic polymers are polystyrene, toughened polystyrene, polymethyl methacrylate, polyvinyl acetate, ethylene/vinyl acetate copolymers and corresponding copolymers and graft copolymers. Saturated polyesters and thermoplastic polyurethanes are also suitable, as are rubber-like block copolymers, in particular those of from 40 to 95% by weight of a diolefin, for example butadiene, isoprene or chloroprene, and from 60 to 65% by weight of a vinylaromatic, for example styrene or p-methylstyrene.

Thickeners in amounts of from 0.1 to 10 parts by weight, based on 100 parts by weight of unsaturated polyester, are added when it is intended to produce SMC materials from the molding material. The conventional thickeners, for example oxides and hydroxides of magnesium, of zinc or of calcium are used for thickening, as well as isocyanates, if necessary together with an amine.

Further additives are inhibitors, such as phenols, quinones and nitroso compounds; lubricants, such as polyethylene powder; paraffin waxes for preventing evaporation of styrene, accelerators, flameproofing agents, mold release agents, viscosity reducers and pigments.

For the preparation of the novel molding material, a melt of the unsaturated polyester A is first combined with a melt of the propylene polymer C, and the melt is subjected to a strong shear field. This may be effected, for example, in a twin-screw extruder, in which the propylene polymer is melted at from 180° to 220° C. and in which a melt of the unsaturated polyester is fed by a pump or via a side extruder at from 100° to 150° C. The residence time of the melt in the twin-screw extruder is preferably from 20 to 300 s. Mixing of the melt should take place in a strong shear field, i.e. the dissipation energy should preferably be greater than 0.05, in particular from 0.1 to 0.4 [kWh.kg$^{-1}$]. The dissipation energy is the specific energy input into the shear element. For example, in a twin-screw extruder, it can be calculated from the torque and the power consumption of the electric motor which transfers the energy to the two screws of the extruder. As a result of the strong shearing, the propylene polymer is comminuted to a particle size of less than 200 μm, in particular from 10 to 100 μm. Since the comminution takes place in the melt, round, virtually spherical particles having a smooth surface are formed and remain in this form even when cooling, as a disperse phase in the coherent polyester phase. This is shown very clearly in the attached drawing, a micrograph of a polypropylene dispersion in a solution of an unsaturated polyester resin in styrene, in dark field/dark illumination.

Cooling to below the crystallite melting point of the propylene polymer preferably below 120° C., is effected in the extruder, so that a dispersion of solid propylene polymer particles in liquid unsaturated polyester is extruded. This dispersion is then either mixed directly with monomer B or cooled further by, for example, extruding it into water and granulating it. The dry, non-blocking granules can be stored and transported and, if desired, dissolved in the monomer B. In principle, the novel molding material can also be processed monomer-free as a free-flowing injection molding material. In this case, crystalline unsaturated polyesters, which are preferably composed of symmetric monomer building blocks, such as fumaric acid, terephthalic acid, butane-1,4-diol or hexane-1,6-diol, are preferred.

The additives D and E are then mixed with the liquid dispersion of propylene polymer particles in the polyester resin (unsaturated polyester+monomer), advantageously in two stages. Shrinkage-reducing thermoplastics, inhibitors, accelerators, viscosity reducers and waxes, advantageously each dissolved or dispersed in the monomer B, are first added. The dispersion obtained is free-flowing and has a long shelf life. In exceptional cases, i.e. where there is a high content of propylene polymer, it is in the form of a paste which must be slightly warmed for further processing. Shortly before further processing, a free radical initiator D is then added, if necessary together with fillers, fibers, release agents, lubricants and thickeners. If it is intended to prepare SMC materials, the material is then formed together with reinforcing fibers into a sheet-like semi-finished product and is thickened.

The novel heat-curable molding material is thus in the form of an SMC, a BMC, a free-flowing injection molding material or a paste. Accordingly, further processing can be carried out by various methods: SMC materials are molded in presses, BMC materials and free-flowing materials by injection molding or injection stamping and pastes by pultrusion. Curing of the polyester resin is effected during or after molding, preferably at above 50° C., in particular from 120° to 170° C.

In the case of a relatively low content of component C in the molding material, for example from 10 to 100 parts by weight, after curing the propylene polymer as a disperse phase remains in the cured polyester resin as the coherent phase. The propylene polymer results in a dramatic increase in toughness in the molding, but the duromer character of the moldings, i.e. high heat distortion resistance and good surface properties, are retained. In the case of a higher content of propylene polymer in the molding material, for example from 80 to 180 parts by weight, it is possible in some cases to achieve phase inversion during curing, so that some or all of the propylene polymer becomes a coherent phase, in which crosslinked polyester resin particles are incorporated as the disperse phase. This phase inversion can be promoted by the following measures: high melt flow index and low crystallite melting point of the propylene polymer, low reactivity of the curing agent system, strong system inhibition and high mold temperature during curing. Such moldings are thermoplastically deformable within limits, for example they can be molded and compression molded at elevated temperatures; in particular waste and old parts can be recycled.

Fields of use of the novel molding materials are the production of automotive parts, for example engine hoods, tailgates, bumper supports and front ends in the bodywork sector and sound insulations, intake manifolds and covers in the engine sector, as well as recesses for spare wheels, back rests for seats and reflectors for headlamps. Applications in the electrical sector, for example the production of distribution boxes, long-field lights and housings for electrical systems, also play a role.

In the Examples which follow, parts and percentages are by weight.

EXAMPLES

A) Unsaturated polyester resins

UP resin A1

The monomer-free unsaturated polyester was prepared in a two-stage condensation process while stirring and by passing over nitrogen. In the first stage, isophthalic acid, neopentylglycol and propylene glycol reacted in a molar ratio of from 1:1.2:0.23 at up to 200° C. to an acid number of 10 and a melt viscosity of 1,000 [mPa.s] (plate-and-cone viscometer, Epprecht Instruments+Controls AG) at 125° C. After the addition of maleic acid and further neopentylglycol in a molar ratio of 1:0.6, based on 1 mol of isophthalic acid used, esterification was finally continued to an acid number of 19 and a melt viscosity (175° C.) of 4,300 [mPa.s], the mixture was cooled to 150° C., 180 ppm of hydroquinone was added and the mixture was poured into cooling trays. On cooling to 23° C., the product solidified in glassy form and could be broken. The granules were non-blocking during storage and had a softening point of 80° C. (according to Krämer-Sarnow-Nagel). UP resin 2 (for comparison)

UP resin A1 was dissolved to an extent of 56% in styrene, and 0.3% of propylene glycol was added. The solution had a viscosity (23° C.) of 1,300 [mPa.s] according to DIN 53,214 and a refractive index (20° C.) of 1.54 according to DIN 51,423, Part 1.

C) Propylene polymers

C1 Propylene homopolymer having a melt flow index MFI (230/2.16) of 70 [g/10 min] (DIN 53,735), a melting point (DSC) of 162 [°C.] (ISO 3146) and a density of 0.907 [g/cm$^3$] (DIN 53,479-A).

C2 Propylene homopolymer which is grafted with 0.15% of maleic anhydride and has a melt flow index MFI (230/2.16) of 27 and a melting point (DSC) of 162° C.

PATENT EXAMPLE 1

The melt dispersing of polypropylene in an unsaturated polyester, the preparation of a dispersion in a solution of the polyester resin in styrene, which dispersion is free-flowing at room temperature, and the processing thereof to give SMC are described, as shown clearly in the attached diagram.

a) Melt dispersing

For the preparation of granules having a disperse polypropylene phase, polypropylene C1 was melted in a twin-screw extruder (Type ZSK 3D, Werner & Pfleiderer) at 170° C. and a melt of the unsaturated polyester A1 at 120° C. was introduced from a side extruder. The specific energy input was 0.2 [kWh.kg$^{-1}$], the screw speed was 150 revolutions/minute, the temperature in the mixing zone was 154° C. and that at the die was 150° C. The extrudate was drawn through water and granulated. It contained 45% of polypropylene and 55% of unsaturated polyester. The granules could be stored for weeks at 23° C. without blocking.

b) Preparation of a dispersion

In a stirred apparatus, 30 parts of styrene were mixed a little at a time at 23° C. while stirring with 70 parts of the above granules, 100 ppm of hydroquinone and 500 ppm of tert-butylpyrocatechol were added and the mixture was heated to 80° C. After two hours, a free-flowing dispersion having an acid number of 8.3 and a viscosity (23° C.) of 18,800 [mPa.s] had formed. To characterize the polypropylene phase, the dispersion was investigated under an optical microscope. The attached photograph shows a dark field/dark illumination photograph (magnification 100:1) of the polypropylene dispersion in the UP resin. The mean particle size is about 50 μm. The particles have a virtually round shape and a smooth surface.

c) Preparation and testing of SMC

The following resin/filler mixture was prepared with the aid of a high-speed stirrer:

100 parts of dispersion 1b)
0.3 part of propylene glycol
1.5 parts of tert-butyl perbenzoate
50 parts of chalk as a filler (Millicarb ®)
4.5 parts of MgO paste Luvatol ® MK 35
4.0 parts of zinc stearate.

The SMC was prepared in a pilot plant in which the resin/filler mixture was combined with cut glass rovings (2.5 cm long) on a polyethylene film, rolled up and stored for 3 days at 23° C. Thereafter, the cover films could be peeled off and the nontacky SMC was compression molded in a polished steel mold for 5 minutes under 50 bar at 145° C. to give 4 mm thick sheets having a glass fiber content of 40%. Table 1 compares the properties of moldings of SMC 1C and glass mat-reinforced polypropylene containing 40% by weight of glass fibers (GM-PP 40). The advantages of the novel fillers are clear in all test results, in particular in the case of shock in the falling-ball test.

The falling-ball test is carried out as follows. For this test, test specimens (80×80 mm) are produced from 4 mm thick molded sheets and are clamped between metal rings (diameter 60 mm), and a steel ball (761 g, diameter 57.1 mm) is then allowed to fall from a height of 70 cm. The tension side of the damaged test specimen is sprayed with a red dye solution (diffusion red, H. Klumpf), washed with water after 5 minutes and dried, and the diameter of the red damage zone is determined. The center of the damage zone is cut through and the thickness of the red zone is measured on the cut surface (magnifying glass with scale). The lower the numerical values of the two parameters, the more insensitive are the moldings to shock and impact.

TABLE 1

| | | Molding of SMC 1C | Comparison GM-PP 40 |
|---|---|---|---|
| Modulus of elasticity (according to EN 63) | [N/mm$^2$] | 11,000 | 5,600 |
| Impact strength (23° C.) (according to DIN 53,453) | [kJ/m$^2$] | 100 | 70 |
| Falling-ball test | | | |
| Depth of damage | [mm] | 0.8 | 2.5 |
| Damage zone (Diameter) | [mm] | 15 | 25 |

PATENT EXAMPLE 2 a) Melt dispersing

Maleic anhydride-grafted polypropylene C2 was melted in a twin-screw extruder (ZSK 30) at 220° C. and mixed with the melt of the unsaturated polyester A1 from a side extruder. The screws in both extruders were rotated at 150 revolutions/minute, the temperature in the mixing zone was 180° C. and that at the die was 150° C. The specific energy input was 2.18 [kWh.kg$^{-1}$]. After passing through a water bath, the extruded product could be granulated. The non-blocking granules having a long shelf life contained 40% of polypropylene C2 and 60% of unsaturated polyester A1.

b) Preparation of a dispersion

In a stirred apparatus, 30 parts of styrene were mixed a little at a time at 23° C. while stirring with 70 parts of granules 2a, 100 ppm of 2,6-dimethylquinone and 500 ppm of tert-butyl-p-cresol were added and the mixture was heated to 80° C. After three hours, a free-flowing dispersion having a viscosity (23° C.) of 29,300 [mPa.s] had formed.

c) Preparation and testing of laminates produced by the wet lamination method.

The following mixtures were prepared from dispersion 2b using a high-speed stirrer:
100 parts of dispersion 2b
1.5 parts of tert-butyl perbenzoate
various amounts of filler (chalk).

For comparison, corresponding mixtures were also prepared from UP resin 2. Laminates were obtained by impregnating five layers of glass fiber mats (bound so as to be styrene-insoluble) and were compression molded in a sheet mold of steel (4×150×150 mm) at 170° C. under 200 bar for 20 minutes and tested by the falling-ball test.

The results in Table 2 show that the novel laminates with a disperse polypropylene phase have less sensitivity to shock than those based on its UP resin.

TABLE 2

|  | Dispersion 2b (Parts) | UP resin 2 (Parts) | Chalk (Parts) | Falling-ball test | |
|---|---|---|---|---|---|
|  |  |  |  | Damage zone [mm] | Penetration depth [mm] |
| Example 2 | 100 | — | — | 5 | 0.3 |
| Example 2 | 100 | — | 50 | 15 | 0.7 |
| Example 2 | 100 | — | 100 | 20 | 1.7 |
| Comparison | — | 100 | — | 30 | 4.3 |
| Comparison | — | 100 | 50 | 20 | 4.1 |
| Comparison | — | 100 | 100 | 25 | 4.2 |

We claim:

1. A process for the preparation of a molding material containing
   A) 100 parts by weight of an unsaturated polyester,
   B) from 0 to 400 parts by weight of a vinyl or allyl monomer copolymerizable with A,
   C) from 5 to 200 parts by weight of a semicrystalline propylene homo- or copolymer containing predominantly propylene and having a random distribution of the monomers,
   D) from 0.01 to 5 parts by weight of a free radical initiator and
   E) conventional additives and assistants,
   wherein component C is dispersed in the form of solid, round particles having a smooth surface and a mean diameter of from 1 to 200 μm in a coherent phase of components A+B,
   wherein a melt of the unsaturated polyester A is combined with a melt of the propylene polymer C, the mixture of said melts is subjected to a strong shear field in the absence of free radical initiator, the propylene polymer being comminuted to a particle size of less than 200 μm, the melt if cooled to below the crystallite melting point of the propylene polymer so that a dispersion of solid propylene polymer particles in liquid unsaturated polyester is formed, then, optionally, the monomer B is added directly to the dispersion, and finally the additives D and E are mixed in.

2. A process for the preparation of a molding material containing
   A) 100 parts by weight of an unsaturated polyester,
   B) from 0 to 400 parts by weight of a vinyl or allyl monomer copolymerizable with A,
   C) from 5 to 200 parts by weight of a semicrystalline propylene homo- or copolymer containing predominantly propylene and having a random distribution of the monomers,
   D) from 0.01 to 5 parts by weight of a free radical initiator and
   E) conventional additives and assistants,
   wherein component C is dispersed in the form of solid, round particles having a smooth surface and a mean diameter of from 1 to 200 μm in coherent phase of components A+B,
   wherein a melt of the unsaturated polyester A is combined with a melt of the propylene polymer C, the mixture of said melts is subjected to a strong shear field in the absence of free radical initiator, the propylene polymer being comminuted to a particle size of less than 200 μm, the melt is cooled to below the crystallite melting point of the propylene polymer so that a dispersion of solid propylene polymer particles in liquid unsaturated polyester is formed, then the dispersion is cooled, then, optionally, the dispersion is dissolved in the monomer B, and finally the additives D and E are mixed in.

3. The process of claim 1, wherein the molding material contains, as component B, from 20 to 150 by weight of styrene, vinyltoluene, methyl methacrylate, diallyl phthalate or diallyl isophthalate.

4. The process of claim 2, wherein the molding material contains, as component B, from 20 to 150 by weight of styrene, vinyltoluene, methyl methacrylate, diallyl phthalate or diallyl isophthalate.

5. The process of claim 1, wherein component C is a propylene polymer having a melt flow index MFI greater than 10 g/10 min (at 230° C. and 2.16 kg) and a crystallite melting point higher than 125° C.

6. The process of claim 2, wherein component C is a propylene polymer having a melt flow index MFI greater than 10 g/10 min (at 230° C. and 2.16 kg) and a crystallite melting point higher than 125° C.

7. The process of claim 1, wherein the molding material is shaped, and is cured at above 50° C.

8. The process of claim 2, wherein the molding material is shaped, and is cured at above 50° C.

* * * * *